United States Patent
Uzelac et al.

(10) Patent No.: US 9,644,957 B2
(45) Date of Patent: May 9, 2017

(54) INTERACTION DEVICE CORRECTIVE PARAMETERS

(71) Applicant: MICROSOFT TECHNOLOGY LICENSING, LLC, Redmond, WA (US)

(72) Inventors: Aleksandar Uzelac, Seattle, WA (US); David Abzarian, Kenmore, WA (US); Silvano Bonacina, Redmond, WA (US); Changsin Lee, Redmond, WA (US); Alan W. Stephenson, Redmond, WA (US); Michael A. Nelte, Redmond, WA (US); Uros Batricevic, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 939 days.

(21) Appl. No.: 13/919,143

(22) Filed: Jun. 17, 2013

(65) Prior Publication Data

US 2014/0372061 A1    Dec. 18, 2014

(51) Int. Cl.
*G01B 21/04* (2006.01)
*G06F 21/62* (2013.01)
*G06F 21/83* (2013.01)

(52) U.S. Cl.
CPC ......... *G01B 21/04* (2013.01); *G06F 21/6218* (2013.01); *G06F 21/83* (2013.01)

(58) Field of Classification Search
CPC ...... G01B 21/04; G06F 21/6218; G06F 21/83
See application file for complete search history.

(56) References Cited

U.S. PATENT DOCUMENTS

| 5,179,254 A | 1/1993 | McDermott |
| 5,326,940 A | 7/1994 | Doubrava et al. |
| 6,727,896 B2 | 4/2004 | Tsang |
| 7,750,891 B2 | 7/2010 | Stephanick et al. |
| 2005/0110769 A1 | 5/2005 | DaCosta et al. |

(Continued)

FOREIGN PATENT DOCUMENTS

| FR | WO 2011085985 A1 * | 7/2011 | ........... G06F 3/0416 |
| WO | WO00/57262 A1 | 9/2000 | |
| WO | WO2011085985 A1 | 7/2011 | |

OTHER PUBLICATIONS

PCT International Search Report and Written Opinion for Application No. PCT/US2013/060780, mailed Feb. 27, 2014, 8 pages.

*Primary Examiner* — Manuel Rivera Vargas
(74) *Attorney, Agent, or Firm* — Jacob P. Rohwer; Newport IP, LLC (57) ABSTRACT

The techniques described herein are directed to receiving parameters directed to correcting spatial error and/or jitter associated with an interaction device connected to a computing device. In some instances, the parameters are encrypted parameters that may be decrypted and consumed to correct the spatial error and/or the jitter associated with the interaction device. For instance, the parameters may provide an adjustment to one or more reported positions of input received from a detection area of the interaction device, so that a display position more accurately reflects, based on the adjustment, an actual position of input on the detection area of the interaction device.

20 Claims, 5 Drawing Sheets (56) References Cited

U.S. PATENT DOCUMENTS

2009/0078474 A1   3/2009  Fleck et al.
2010/0315200 A1  12/2010  Warrier
2011/0141052 A1   6/2011  Bernstein et al.
2012/0268415 A1  10/2012  Konovalov et al.
2013/0002600 A1*  1/2013  McCracken .......... G06F 3/0416
                                                                       345/174

* cited by examiner

INTERACTION DEVICE CORRECTIVE PARAMETERS

BACKGROUND

Analog and/or digital interaction devices, such as direct touch digitizers, touchpad digitizers, pen-based digitizers, air-based gesturing digitizers, and so forth, have inherent spatial error and/or jitter. The inherent spatial error and/or jitter is often unique to the particular interaction device and it often impacts a user interaction experience since movement on a display screen (e.g., cursor movement, a pan operation) may not accurately reflect the actual position and/or velocity of an object interacting with the interaction device.

For instance, spatial error and/or jitter may arise because sensor types and sensor layouts may be unable to accurately report the actual position of an input and/or velocity of input as the input moves. Moreover, the spatial error and/or jitter may become more noticeable as detection areas of interaction devices continue to expand and provide more input space.

SUMMARY

The techniques described herein are directed to receiving parameters directed to correcting spatial error and/or jitter associated with an interaction device connected to a computing device. In some instances, the parameters are encrypted parameters that may be decrypted and consumed to correct the spatial error and/or the jitter associated with the interaction device. For instance, the parameters may provide an adjustment to one or more reported positions of input provided to a detection area of the interaction device, so that a display position more accurately reflects an actual position of input on a detection area of the interaction device.

This summary is provided to introduce a selection of concepts in a simplified form that are further described below in the detailed description. This summary is not intended to identify key or essential features of the claimed subject matter, nor is it intended to be used as an aid in determining the scope of the claimed subject matter. The term "techniques," for instance, may refer to system(s), method(s), computer-readable instructions, algorithms, components, modules, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

The techniques described herein resolve spatial error and/or jitter for an interaction device by learning correction parameters that can be provided to, and/or consumed by, an operating system so the error can be corrected. That is, the operating system or other signal processing entity may use the correction parameters to compensate for positional error by adjusting a position reported by the interaction device so that a corresponding display position more accurately reflects an actual position of input on a detection area of the interaction device. Accordingly, movement of elements on a display screen is smoother after consumption of the correction parameters.

In some instances, the operating system may receive encrypted correction parameters from the interaction device during an enumeration process or other device identification and configuration process. For instance, an entity that learns the correction parameters may encrypt the correction parameters using various encryption algorithms and/or techniques and store the encrypted correction parameters in the interaction device. The entity may then authorize the operating system to consume the correction parameters by providing the operating system with a corresponding decryption algorithm and/or technique. After the interaction device connects to a computing device and provides the encrypted correction parameters, the operating system on the computing device decrypts the encrypted correction parameters and/or verifies the interaction device. The operating system may then apply the correction parameters to data signals that report interaction positions of one or more objects with respect to a detection area of the interaction device (e.g., a surface, a plane, a two-dimensional or three-dimensional field, etc.). Accordingly, the operating system is able to compensate for the spatial error and/or jitter by consuming the correction parameters.

As discussed herein, the correction parameters may be encrypted and stored on a memory associated with the interaction device to protect the efforts (e.g., time, resources, money, etc.) exerted to learn the correction parameters. For example, an entity (e.g., a company, a manufacturer, etc.) that produces a proprietary operating system may deploy their system in a variety of computers produced by different third-party manufacturers (e.g., different models and/or brands of computers). Thus, after deployment, the proprietary operating system may interact with multiple different types of interaction devices that may be part of, or connectable to, the computers (e.g., there may be hundreds of different types of interaction devices). The different types of interaction devices may also be produced by different third-party companies or manufacturers.

Thus, the techniques describe herein learn, as part of a training phase or as part of continual use, correction parameters for individual interaction devices. The techniques may encrypt the learned correction parameters and/or store the correction parameters in a memory associated with the interaction device. Then, after the interaction device is connected to an operating system that is authorized to decrypt the encrypted correction parameters (e.g., a proprietary operating system or partner operating system of an entity that exerts the efforts to learn the correction parameters), the correction parameters may be used to improve the performance of the interaction device (e.g., minimize or eliminate spatial error and/or jitter). In contrast, if the interaction device is connected to an operating system not authorized to decrypt the encrypted parameters (e.g., an operating system not configured with a corresponding decryption algorithm and/or techniques), then the correction parameters are protected and cannot be used to improve the performance of the interaction device. Therefore, by encrypting the correction parameters, the techniques described herein provide an element of protection to an entity, or partner entities, that expend the efforts to improve interaction device performance by learning the correction parameters.

In various embodiments, the operating system may implement a filtering process or other error correction process to learn correction parameters and improve the performance of the interaction device. For example, the operating system may implement a filtering process or other error correction process if the encrypted correction parameters are not provided to the operating system by the interaction device.

Figure 1:
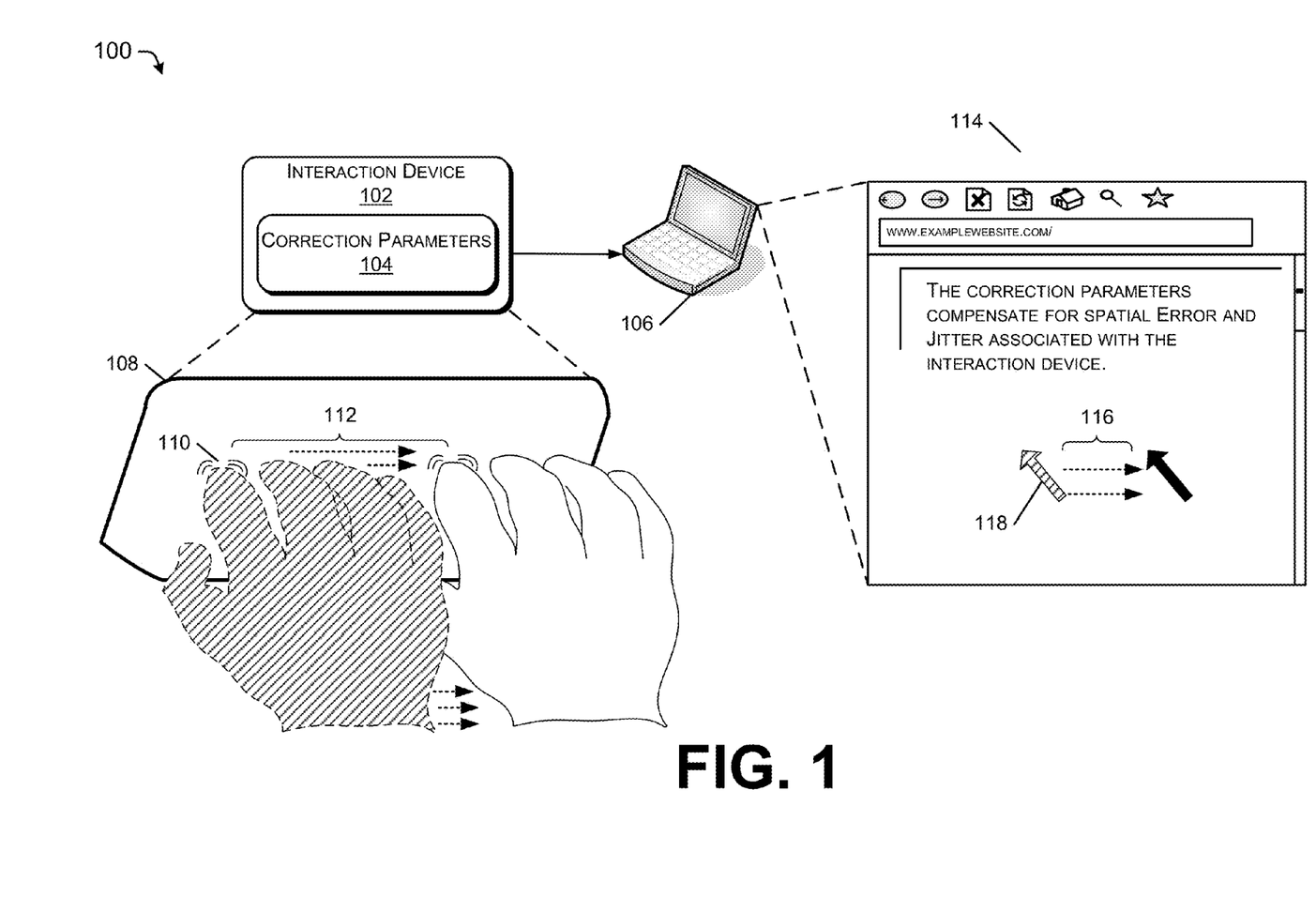
FIG. 1 illustrates an example implementation of a computing device that receives correction parameters from an interaction device, in accordance with various embodiments.

FIG. 1 illustrates an example overview 100 of an interaction device 102 that stores correction parameters 104 in an associated memory, and provides the correction parameters 104 to a computing device 106 during an enumeration process or another device identification and configuration process. In at least one implementation, the correction parameters 104 are encrypted, and thus, in order to consume the correction parameters, the computing device 106 may be authorized to decrypt the correction parameters (e.g., using a corresponding decryption algorithm or decryption technique). The computing device 106 may decrypt the encrypted correction parameters 104 and/or apply the correction parameters to input signals received from the interaction device 102 to compensate for spatial error and/or jitter. As discussed above, the encryption/decryption of the correction parameters ensure that the correction parameters can only be used on computing devices that have been authorized to benefit from a training phase that learns the correction parameters for individual interaction devices (e.g., hundreds of interaction devices). Conversely, the encryption/decryption of the correction parameters protects them from being used on computing devices that have not been authorized to benefit from the training phase.

As discussed herein, the interaction device 102 may be any one of a variety of digitizers capable of receiving input from one or more objects and providing digital signals that report interaction positions and/or interaction velocity of the input from the one or more objects. For instance, the interaction device 102 may be an indirect touch device (e.g., a touchpad, a click-pad, a pressure-pad, etc.), a direct touch device (e.g., a touch screen, etc.), an air gesture sensing device that may use cameras or other image sensing techniques, or any other device capable of receiving input and providing digital signals to the computing device 106. In various embodiments, the interaction device 102 may be part of a keyboard or other data input mechanism that is part of, or connectable to, the computing device 106. In some implementations, the interaction device 102 may be a separate input mechanism that is individually part of, or connectable to, the computing device 106. Accordingly, the interaction device 102 may be a device that is permanently attached to the computing device 106 (e.g., as part of a production process such as before purchase of the computer 106 by a consumer), or a device that is freely attachable and/or detachable (e.g., as part of a post-production process such as after purchase of the computer 106 by a consumer).

The interaction device 102 may include an input detection area 108 or other input acquiring mechanism (e.g., a surface, an interaction plane, etc.). In various embodiments, the input detection area 108 may be opaque, transparent, or a combination of both. The interaction device 102 is configured to sense and determine a position of input of one or more objects 110 (e.g., finger, pen, stylus, etc.) or parts of an object (e.g., detection points of an arm or hand to determine an air gesture, etc.) with respect to the detection area 108. Moreover, the interaction device 102 may sense multiple positions of input of the object 110 representing movement 112 from a first location to a second location.

As discussed herein, an "object" 110 may be a physical tool (e.g., finger, pen, stylus, pointing mechanism, etc.) or a part (e.g., limb of a body) that may apply contact, or initiate an input position with respect, to the detection area 108 of the interaction device 102. Thus, the object 110 is able to provide positional input that is sensed by the interaction device 102 with respect to the detection area 108. As illustrated in FIG. 1, the object 110 is a finger of a hand used to interact with the detection area 108 of the interaction device 102. The interaction may be directed to functionality executing on the computing device 106 (e.g., web browsing, watching a video, playing a game, reading an electronic book, etc.).

The computing device 106 may include, but is not limited to, any one of a variety of devices, such as a laptop computer, a desktop computer, a tablet computer, a portable computer, a smart phone, a mobile phone, a personal digital assistant (PDA), an electronic book device, a gaming console, a personal media player device, a server computer or any other electronic device that may receive signals from the interaction device 102, and apply the correction parameters 104 to compensate for spatial error and/or jitter of the interaction device 102. For instance, the computing device 106 consumes the correction parameters 104 to improve display response to input and to smooth display operations on a display screen 114. For example, the correction parameters 104 may cause the movement 116 of a cursor 118 or other display screen elements (e.g., text, images, etc.) to more accurately reflect, and align with, the movement 112 of the object 110 on the detection area 108 (e.g., position of movement, velocity of movement, etc.). The movement 112 of the object 110 on the detection area 108 may be directed to moving the cursor 118 (e.g., a mouse operation) or may be directed to other movement, such as a pan operation, a zoom operation, a scroll operation, etc. Thus, the movement may be directed to adjusting display screen elements (e.g., zoom in on an image, scroll through text, move a character in a game, etc.).

Figure 2:
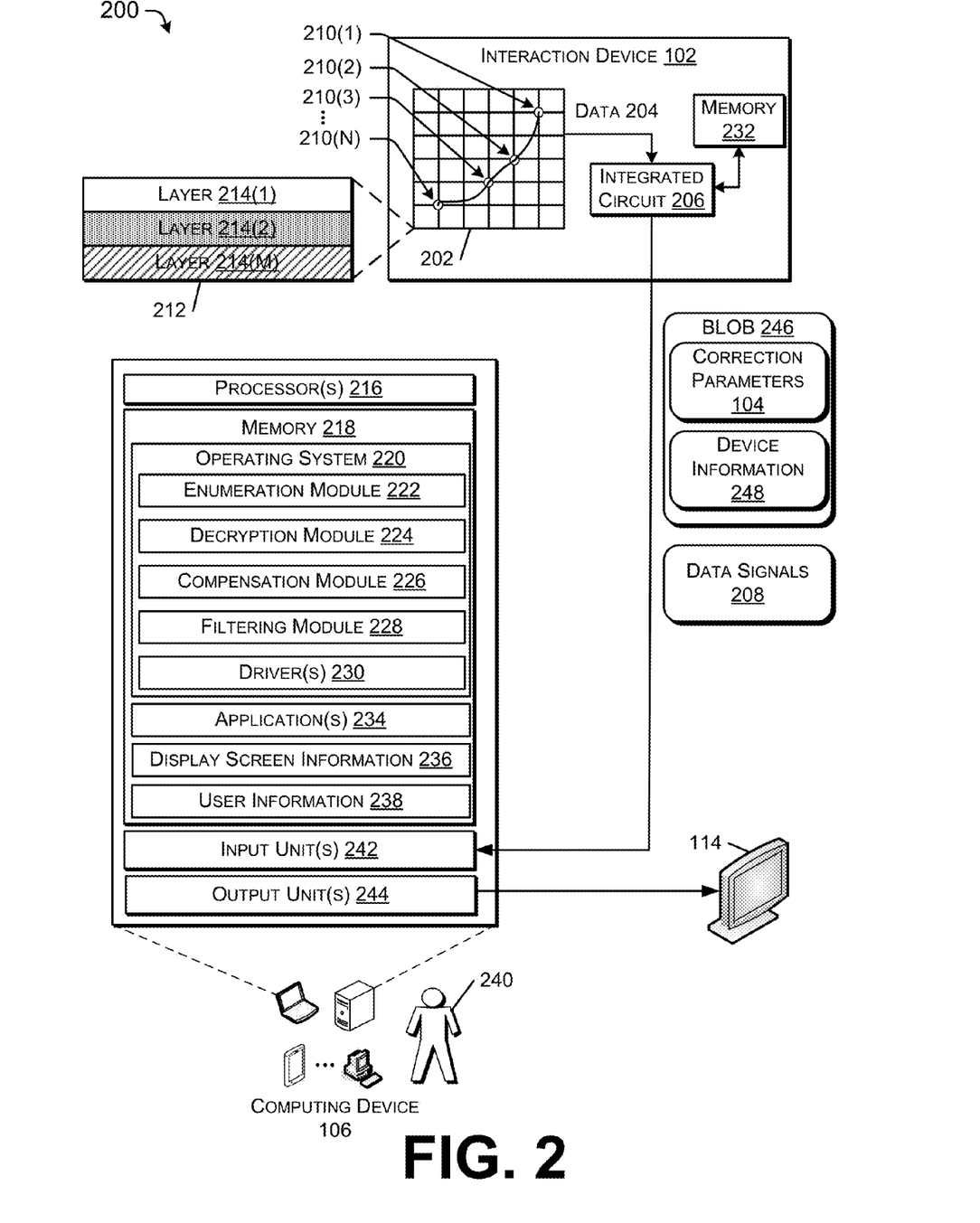
FIG. 2 illustrates an example environment and components for receiving correction parameters from an interaction device and consuming the correction parameters at the computing device, in accordance with various embodiments.

FIG. 2 illustrates an environment 200 that further describes components of the interaction device 102 and the computing device 106. For example, the interaction device 102 may include a grid, or an array, of sensors 202 positioned underneath, above, on the sides of and/or within a detection area. The sensors 202 may include one or more of capacitive sensors, resistive sensors, conductance sensors, optical sensors, acoustic sensors, and so forth. Accordingly, the sensors 202 are configured to determine or sense a position of an object with respect to the detection area, and relay data 204 (e.g., analog data) associated with the sensed positions to an integrated circuit (IC) 206 of the interaction device 102. In various embodiments, the grid of sensors 202 determines a position of an object in a two-dimensional space (e.g., an x coordinate and y coordinate at a given time). In other embodiments, the grid of sensors 202 may sense a three-dimensional position of the object (e.g., an air gesture of an arm, a hand, etc.). The IC 206 is configured to convert the data 204 into digital signals 208 representing positional information of the object, as well as timing information for the positional information (e.g., a timestamp). The IC 206 then reports the digital signals 208 to the computing device 106 so that the input a user provides to the interaction device 102 can be executed on the computing device 106 and/or reflected on the display screen 114.

However, as discussed above, the data signals 208 reported by the interaction device 102 include inherent spatial error and/or jitter. For example, the IC 206 may report a deviated position (e.g., a position where the IC 206 expects an object to be at a particular instance of time or a position where the IC 206 predicts the object will be at a particular instance of time). This expected or predicted position may be behind (e.g., lag) the actual position of the object with respect to the detection area 108 or may be ahead of (e.g., overshoot) the actual position of the object with respect to the detection area 108. As an example, the grid of sensors 202 may receive a sample set of sensed positions 210(1) . . . 210(N) of the object. However, the IC 206 may be unable to accurately capture the actual movement of the object based on a size of the sample set of sensed positions 210(1) . . . 210(N) and/or the spacing between pairs of the sensed positions 210(1) . . . 210(N). In other words, the sensed positions 210(1) . . . 210(N) may not provide enough representation of input (e.g., position, velocity) that occurs between each pair of sensed positions. Thus, the IC 206 may calculate and report an expected or predicted position of the object, which may stray from the actual position, thereby introducing spatial error and/or jitter.

The root cause of the spatial error and/or jitter may be related to a layout and/or type of the sensors 202. For instance, layouts of sensor may vary with respect to a pattern of sensors 202, a number of sensors 202, a number of lines of sensors 202, a spacing or distance between sensors 202, a spacing or distance between lines of sensors, a pitch of the sensors 202, a thickness of the sensors 202 and so forth.

FIG. 2 further illustrates a side view 212 of an example sensor 202 that has multiple layers 214(1) . . . 214(M). A first layer 214(1) may be a glass layer, the second layer 214(2) may be the actual sensing mechanism, and the $M^{th}$ layer 214(M) may be a liquid-crystal display (LCD). Different interaction devices may use different glass, different types of sensing mechanisms, and/or different LCDs. Thus, the jitter and spatial properties of an interaction device may be unique to that device based on the configuration and/or type of sensors used to receive and/or report the input from an object.

The computing device 106 may include one or more processors 216 and memory 218. The processor(s) 216 may be a single processing unit or a number of units, each of which could include multiple different processing units. The processor(s) 216 may include a microprocessor, a microcomputer, a microcontroller, a digital signal processor, a central processing unit (CPU), a graphics processing unit (GPU), etc. Alternatively, or in addition, the techniques described herein can be performed, at least in part, by one or more hardware logic components. For example, and without limitation, illustrative types of hardware logic components that can be used include a Field-programmable Gate Array (FPGA), a Program-specific Integrated Circuit (ASIC), a Program-specific Standard Products (ASSP), a state machine, a Complex Programmable Logic Device (CPLD), other logic circuitry, a system on chip (SoC), and/or any other devices that manipulate signals based on operational instructions. Among other capabilities, the processor(s) 216 may be configured to fetch and execute computer-readable instructions stored in the memory 218.

The memory 218 may include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PRAM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave. As defined herein, computer storage media does not include communication media.

The memory 218 includes an operating system 220 that is configured to manage hardware and services within and coupled to the computing device 106 for the benefit of other modules, components and devices. In various embodiments, the operating system 220 includes an enumeration module 222, a decryption module 224, a compensation module 226, a filtering module 228, and/or one or more drivers 230, each of which is further discussed herein.

As used herein, the term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. In some instances, the functions and/or modules are implemented as part of an operating system. In other instances, the functions and/or modules are implemented as part of a device driver 230 (e.g., a driver for a touch surface), firmware, and so on.

In some embodiments, some or all of the functionality performed by the decryption module 224 and/or the compensation module 226 may be performed by a device driver 230 associated with the interaction device 102. The driver 230 may communicate with the interaction device 102 through a bus or other communications subsystem that connects hardware to the computing device 106. In other embodiments, some or all of the functionality performed by the decryption module 224 and/or the compensation module 226 may be implemented by the IC 206 of the interaction device 102. In various embodiments, the interaction device 102 may be associated with a memory 232 that may store the decryption module 224 and/or the compensation module 226. The memory 232 may be coupled to the IC 206 within the interaction device 102. Or the memory 232 may be part of the IC 206 (e.g., onboard memory).

The memory 218 may also store, or otherwise have access to (e.g., network or other communications connections), one or more applications 234 (e.g., often referred to as "apps"), display screen information 236, and/or user information 238 associated with a user 240 or other entity controlling an object 110 and/or providing the input to the interaction device 102. The user 240 may be viewing the display screen 114 and/or controlling or manipulating the object 110 in association with the execution of one of the applications 234 or other computer device 106 functionality.

Example applications 234 may include a browsing application, a gaming application, a media player application, an email application, an instant messaging application, a data processing application, a social networking application and so forth. The display screen information 236 may include a size of the display screen, a resolution of a display screen and other display screen information that may be used by the compensation module 226 to consume the correction parameters 104 (e.g., convert the data signals 208 to corresponding operations on the display screen 114 to minimize, or eliminate, jitter and/or spatial issues). In various embodiments, the display screen information 236 may be determined from a device driver 230 associated with the display screen 114.

The user information 238 may include information that may affect, or influence, how the compensation module 226 consumes the correction parameters 104. The information may relate to one or more of a usual velocity of object movement with respect to the surface area, a size of an input object or input contact (e.g., size of a finger), applications 234 the user 240 commonly interacts with via the interaction device 102, a region of the detection area in which the user 240 usually interacts, and so forth. The compensation module 226 may access the user information 238 to tailor the correction to the user 240. For instance, the correction parameters 104 may be different for various sized objects, various velocities of input, various applications, and/or various regions of the detection area. Accordingly, the compensation module 226 may correlate correction parameters 104 to the user information 238 to improve the performance of the interaction device 102 for an individual user 240 (e.g., identified via log-in credentials, recognized via optical scan, etc.).

In various embodiments, the computing device 106 also includes input unit(s) 242 to receive input (e.g., the interaction device 102, a keyboard, a mouse, a microphone, a camera, other sensors, etc.) and output unit(s) 244 to convey and/or visually present information (e.g., display screen 114, speakers, printer, etc.).

In various embodiments, the enumeration module 222 is configured to determine that the interaction device 102 is connected, or coupled, to the computing device 106. Therefore, the enumeration module 222 may implement an enumeration process or another device identification and configuration process to determine internal and/or external devices to be managed by the operating system 220. As part of the enumeration process or device identification and configuration process and before data signals 208 representing positional information for input of one or more objects, the enumeration module 222 may receive the correction parameters 104 from the interaction device 102, so that the compensation module 226 can compensate for the spatial error and/or jitter of the interaction device 102. As discussed above, the correction parameters 104 may be encrypted to protect the efforts exerted to learn the correction parameters 104.

The correction parameters 104 may be stored in the memory 232 associated with the interaction device 102. For example, an entity implementing the training phase may encrypt the correction parameters 104 and/or store the correction parameters 104 in the memory 232 so that when the interaction device 102 is connected to a computing device 106, the interaction device 102 can provide the correction parameters 104 to the computing device.

In some embodiments, the correction parameters 104 may be provided to the operating system 220 of the computing device 106 as part of an encrypted binary large object (blob) 246 or other data packet. The encrypted blob 246 may be information that the interaction device 102 already stores in an associated memory 232 and/or provides to the operating system 220 in accordance with a certification process so that the operating system 220 is able to verify that the interaction device 102 satisfies a standard of quality (e.g., performance metrics). For example, an entity that produces and deploys the operating system 220 may implement the certification process to verify that a connected interaction device 102 manufactured by a third party meets or exceeds the standard of quality. Thus, if the enumeration module 222 does not receive the encrypted blob 246, then the operating system 220 may not allow the interaction device 102 to be used, or the operating system 220 may warn the user 238 that performance of the interaction device 102 may not meet the standard of quality. In some instances, the encrypted blob 246 may also include other device information 248, such as an identification of a vendor or manufacturer of the interaction device 102 and/or an identification of a type of the interaction device 102.

In embodiments where the correction parameters 104 are encrypted and after receiving the encrypted correction parameters 104, the decryption module 224 may decrypt the encrypted correction parameters 104 so that they can be consumed by the compensation module 226 to compensate for spatial error and/or jitter. The decryption module 224 may also decrypt the encrypted blob 246 to verify that the interaction device 102 connected to the computing device 106 has passed the certification process that ensures a standard of quality for user interaction. In various embodiments, the decryption module 224 may use a common decryption algorithm or decryption technique to decrypt both the encrypted blob 246 and the correction parameters 104. Moreover, in some instances the correction parameters 104 may be consumable via the decryption of the encrypted blob 246. Accordingly, the operating system 220 may not have to be configured with multiple different decryption algorithms and/or decryption techniques. For example, the same decryption algorithm or decryption technique can be used to decrypt both the encrypted blob 246 and the encrypted correction parameters 104.

In various embodiments, if the interaction device 102 does not provide the correction parameters 104, the operating system 220 may implement functionality of the filtering module 228 to compensate for spatial error and/or jitter. That is, the filtering module 228 may employ one or more of a series of filters to learn the spatial error and/or jitter of the interaction device 102 after the interaction device 102 is connected and to compensate for the spatial error and/or jitter. In some instances, the filters may be adaptive filters, and thus, may be updated as additional data signals 208 representing interactions are consumed by the operating system 220. Thus, the filtering module 228 may configure a filter (e.g., a low-pass filter, a matched filter, etc.) for the interaction device 102 that compensates for the spatial error and/or jitter by determining a particular frequency and/or an amplitude at which to implement correction parameters.

For example, the spatial error for the grid of sensors 202 may be particularly relevant during a slow panning gesture and the jitter may reveal a particular frequency (e.g., 7-10 hertz) associated with a velocity of movement (e.g., five centimeters per second) where the offset (e.g., spatial error) is increasing or at a maximum compared to a position of contact. The filtering module 228 may implement an adaptive filter to correct the jitter at particular frequency and adjust for a particular offset.

In various embodiments, the filtering module 228 may associate an adaptive filter with a vendor identification or a product identification of an interaction device 102 so that if the interaction device 102 is disconnected and connected a second time, the operating system 220 may be able to use a filter previously adapted to compensate for the spatial error and/or jitter.

In various embodiments, the filter module 228 may implement one or more of various smoothing techniques and/or smoothing algorithms, such as an exponential smoothing algorithm with correction, to correct for the spatial error and/or jitter.

In some embodiments, if the interaction device 102 does not provide the correction parameters 104, the filtering module 228 may build filters and/or smoothing algorithms directed to determining universal correction parameters based on an average spatial error and/or jitter for multiple different types of interaction devices. Thus, the filtering module 228 may be configured to provide a base level of error compensation by implementing the universal correction parameters.

In various embodiments, the filtering module 228 may learn and/or update correction parameters during normal and continual usage of the interaction device (e.g., after the interaction device is connected) by isolating candidate interactions that may be used to determine or train the correction parameters. The candidate interactions may be interactions that satisfy one or more training metrics (e.g., a pan gesture with consistent velocity or velocity within some range). The filtering module 228 may store the candidate interactions as personalized data (e.g., in the user information 238) and then learn and/or update the correction parameters based on information or correctional patterns associated with the candidate interactions. This results in a seamless correction experience for the user 240 even during normal and continuous usage of the interaction device.

Figure 3:
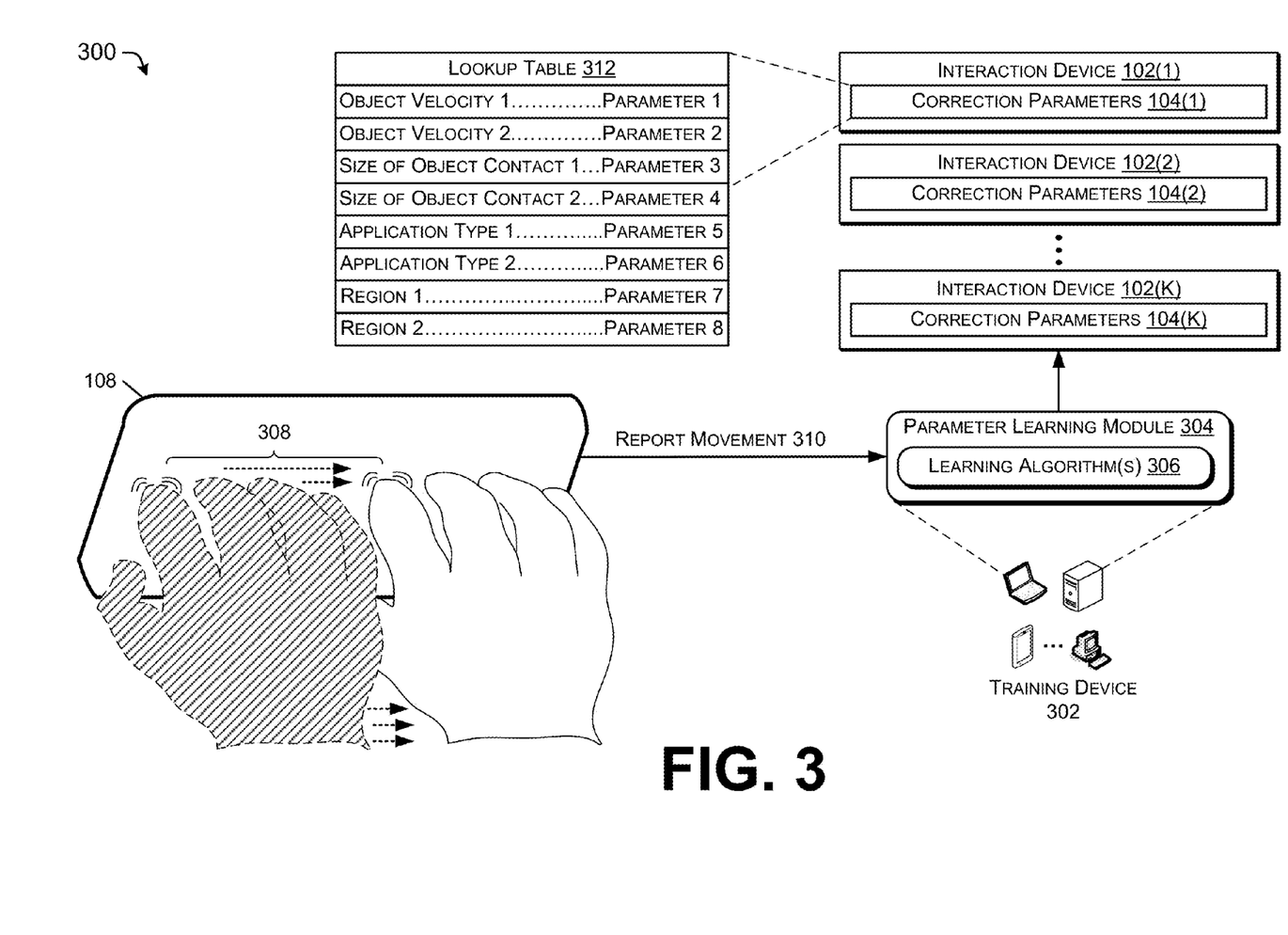
FIG. 3 illustrates an example environment for learning the correction parameters to associate with an interaction device, in accordance with various embodiments.

FIG. 3 illustrates an example environment 300 that implements the training phase where an entity learns the correction parameters. In various embodiments, the training phase occurs before the interaction device 102 is connected to the computing device 106. As discussed above, an entity (e.g., a company that produces the operating system 220) may allocate time and resources to learn the correction parameters for multiple different, individual interaction devices so that a user receives a better interaction experience when using a computing device 106 running the operating system 220. In some instances, the training phase may be implemented with the certification process discussed above.

Thus, FIG. 3 illustrates one or more training device(s) 302 that implement a parameter learning module 304. The training device 302 may be a type of device similar to those discussed above with respect to computing device 106. The parameter learning module 304 is configured to learn correction parameters 104(1) . . . 104(K) for individual interaction devices 102(1) . . . 102(K) (e.g., devices of the same type and same model, different types and different models of devices, etc.). The parameter learning module 304 may employ one or more of a variety of different machine learning algorithms 306 to learn the correction parameters 104(1) . . . 104(K). For instance, the machine learning algorithms may include neural networks, decision trees, support vector machines, and so forth.

In the training phase, one or more trainers use an object (e.g., a finger, a robot controlled pointing tool, etc.) to apply training movement 308 on the surface 108 of the interaction device being tested. For example, the training movement 308 may include controlled movement that has known positions on the detection area 108 and/or constant velocity of movement across the detection area 108. When the movement is controlled, the parameter learning module 304 and/or a trainer is able to determine the actual position of the object. The interaction device being tested reports the sensed movement 310 to the parameter learning module 304. Then, the parameter learning module 306 compares the sensed movement 310 to the actual movement (e.g., actual positions and velocity) and determines differences. The parameter learning module 306 can then determine correction parameters 104(1) . . . 104(K) to compensate for the differences. Furthermore, the parameter learning module 306 may encrypt the correction parameters 104(1) . . . 104(K) and/or store the correction parameters 104(1) . . . 104(K) in respective memories associated with the interaction devices, 102(1) . . . 102(K), so that when the interaction devices 102(1) . . . 102(K) are individually connected to a computing 106, the correction parameters 104(1) . . . 104(K) can be provided to the operating system 220, as discussed above.

Accordingly, the correction parameters 104(1) . . . 104(K) may include any sort of information, equation, filter and so forth capable of correcting and compensating for reported positional errors of objects interacting with the interaction devices 102(1) . . . 102(K). For example, the correction parameters may include an x-offset (e.g., add or subtract a number of units in the x-direction to any reported x-position) and/or a y-offset (e.g., add or subtract a number of units in the y-direction to any reported y-position). In additional examples, the correction parameters may include scaling factors (e.g., linear and non-linear), transforms, cubic functions, quadratic functions, and so forth. In various embodiments, the correction parameters determined may depend on the machine learning algorithms 306.

In some embodiments, the parameter learning module 304 may consider different factors when determining correction parameters 104(1) for an individual interaction device 102 (1). For instance, different correction parameters 104(1) may be associated with different velocity of object movement with respect to the detection area, a size of an input object (e.g., area of contact of a finger), applications 234 or applications types, and/or a region of the detection area. The parameter learning module 304 may configure and store a lookup table 312 to map various factors to different correction parameters. Accordingly, different correction parameters may be implemented based on one or more of the factors in lookup table 312. For example, a different x and y offset may be implemented in a first region of the detection area 108 compared to a second region of the detection area 108. Or, a different x and y offset may be implemented in for a first velocity of movement compared to a second velocity of movement for the same interaction device 102(1). The factors discussed above are provided as example factors that may influence an amount of error between an actual input position and a reported input position. Thus, the parameter learning module 304 may also determine correction parameters in light of other factors associated with the interaction device 102, various objects that provide input to the interaction device and so forth.

In some instances, the factors discussed above are considered in view of the user information 238 (e.g., average contact size of an object, common velocity, etc.). For example, the compensation module 226 may access the lookup table 312 to determine a correction parameter associated with a typical velocity of input for a user. Or, the compensation module 226 may access the lookup table 312 to determine a correction parameter for a region of a detection area in which a user typically provides input.

Figure 4:
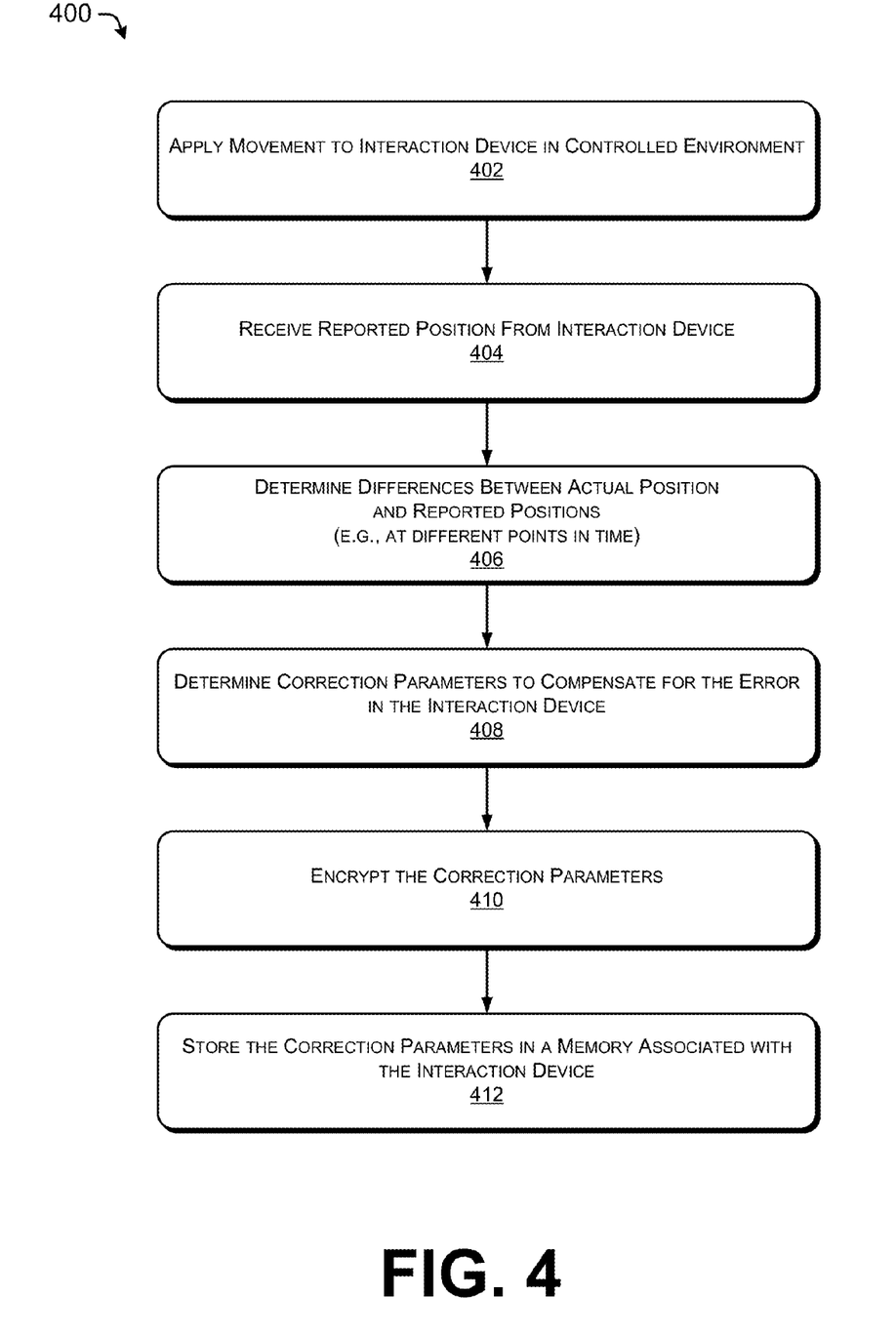
FIG. 4 illustrates an example process that learns correction parameters for different interaction devices, in accordance with various embodiments.
Figure 5:
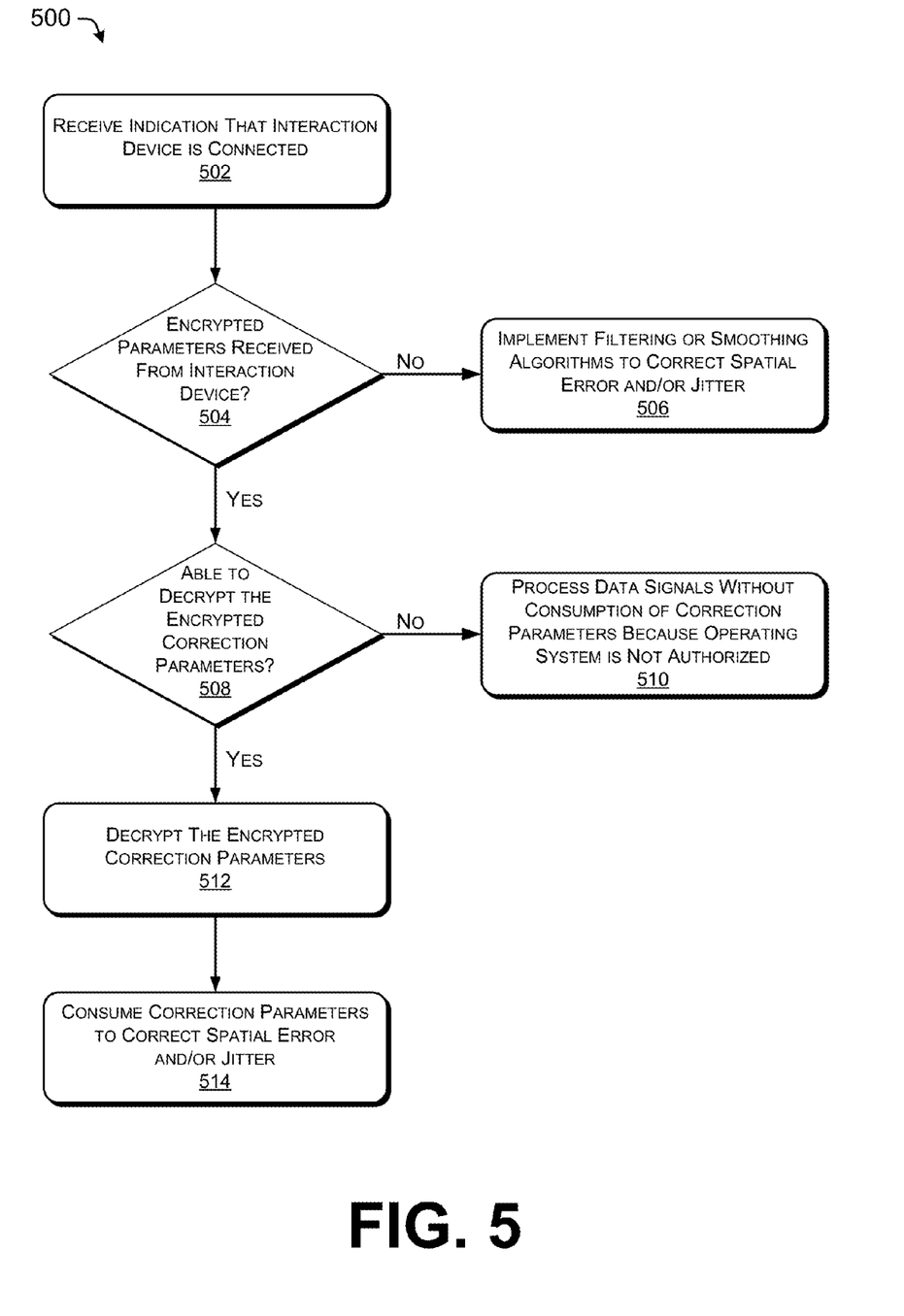
FIG. 5 illustrates an example process that applies correction parameters at a computing device to compensate for spatial error and/or jitter associated with an interaction device, in accordance with various embodiments.

FIGS. 4 and 5 illustrate an example processes that are illustrated as logical flow graphs, which represent a sequence of operations that can be implemented in hardware, software, firmware, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. In some embodiments, any or all of the operations may be implemented in whole or in part by hardware (e.g., as an ASIC, a specialized processing unit, etc.) to execute the described functions. In some instances, the functions and/or modules are implemented as part of an operating system. In other instances, the functions and/or modules are implemented as part of a device driver (e.g., a driver for a touch surface), firmware, and so on.

The order in which the operations are described is not intended to be construed as a limitation, and any number of the described operations can be combined in any order and/or in parallel to implement the processes. The example operations in FIGS. 4 and 5 may be described with reference to the modules, components and/or elements illustrated in FIGS. 1-3.

FIG. 4 illustrates an example process 400 that learns the correction parameters for different interaction devices. That is, the example process 400 describes an implementation of a training phase.

At operation 402, one or more humans, robots or other controlled objects apply movement to an interaction device in a controlled environment. The controlled movement is associated with actual positions of input. Additionally, the controlled movement may reflect the different factors in the lookup table 312. For example, the movement may be controlled with respect to different sizes of objects, different applications in which the movement is directed to, different regions of the detection area, and so forth.

At operation 404, the parameter learning module 304 receives reported positions from the interaction device. For example, the reported positions are associated with the sensed positions and may be based on an expected or predicted position as a result of the grid of sensors. Accordingly, the reported positions include some degree of spatial error and/or jitter.

At operation 406, the parameter learning module 304 determines differences between the actual positions of contact known from the controlled movement and the reported positions. The differences may be associated with different points of time (e.g., corresponding to a time interval in which the controlled movement is applied).

At operation 408, the parameter learning module 304 determines correction parameters to compensate for the spatial error and/or jitter of the interaction device being tested. For example, the parameter learning module 304 may employ one or more machine learning algorithms 306 to generate the correction parameters.

At operation 410, the parameter learning module 304 encrypts the correction parameters learned for the individual interaction device. In various embodiments, the correction parameters may be part of an encrypted blob 246 consumed by a computing device to verify that an interaction device has been certified for use with the operating system 220. Accordingly, in at least one implementation the correction parameters may be learned in conjunction with a certification test.

At operation 412, the parameter learning module 304 stores the correction parameters (e.g., encrypted correction parameters) in a memory associated with the interaction device.

As discussed above, the example process 400 may be performed for individual interaction devices (e.g., same type and same model or different types and/or different models). The example process 400 may occur after production of the interaction device but before the interaction device is permanently attached to a computing device (e.g., as part of a computing device 106 production process) or before the interaction device is sold to an end consumer, who may then attach and/or detach the interaction device to/from the computing device 106.

FIG. 5 illustrates an example process 500 that applies correction parameters at a computing device to compensate for spatial error and/or jitter associated with an interaction device. That is, the example process 500 describes an implementation of a correction parameter consumption phase.

At operation 502, an operating system receives an indication that an interaction device has been connected or attached to a computing device. In various embodiments, the enumeration module 222 receives the indication as part of device enumeration process or other device configuration and identification process. The indication may be part of a permanent interaction device attachment (e.g., a touch screen being attached to the computing device 106 so they can be sold as a single unit) or a temporary interaction device attachment (e.g., a touchpad is connected but may eventually be disconnected and then connected to a different computing device).

At decision operation 504, the operating system determines whether or not encrypted correction parameters are received from the interaction device. If the answer at decision operation 504 is "No", then in at least one embodiment, at operation 506, the operating system 220 implements the functionality of the filtering module 228 to compensate for the spatial error and/or jitter of the interaction device 102. For example, the filtering module 228 may implement and/or adapt one or more filters and/or smoothing algorithms as the operating system 220 continues to receive interaction data signals.

If the answer at decision operation 504 is "Yes", then at decision operation 508, the operating system determines if it is able to decrypt the encrypted correction parameters (e.g., by determining whether it has a corresponding decryption technique or algorithm). If the answer at decision operation 508 is "No", then at operation 510, the operating system is determined to be an operating system that is not authorized to consume the correction parameters, and therefore, the operating system processes data signals without consuming the correction parameters.

If the answer at decision operation 508 is "Yes", then at operation 512, the operating system, such as operating system 220 that is authorized to consume the correction parameters, decrypts the encrypted correction parameters so they are known to the computing device 106. For example, a decryption module 224 of the operating system 220 may use a corresponding decryption algorithm and/or technique to decrypt the correction parameters. In at least one embodiment, the decryption may by coupled with decryption of a blob 246 that is associated with verifying that the interaction device has passed a certification process.

At operation 514, the compensation module 226 of the operating system 220 consumes the correction parameters to correct for the spatial error and/or jitter of the interaction device 102. Accordingly, the user interaction experience is improved as the user will see smoother movement 116 response on a display screen 114.

Conclusion

Although the subject matter has been described in language specific to structural features and/or methodological acts, it is to be understood that the subject matter defined in the claims is not necessarily limited to the specific features or acts described above. Rather, the specific features and acts described above are described as example forms of implementing the claims.

What is claimed is:

1. A system comprising:
one or more processors; and
one or more computer memories storing computer-executable instructions that, when executed, perform operations comprising:
  determining one or more parameters directed to correcting positional error associated with input reported by sensors of an interaction device, the one or more parameters stored in a memory associated with the interaction device, the interaction device for sensing a position of one or more objects with respect to a detection area of the interaction device and for providing the one or more parameters based at least in part on an interaction with the interaction device;
  receiving, from the interaction device, signals indicating movement of the input from the one or more objects interacting with the interaction device; and
  applying the one or more parameters to correct the positional error associated with the input from the one or more objects.

2. The system of claim 1, wherein the signals are based on a sensed position of an object of the one or more objects with respect to the detection area of the interaction device and the positional error indicates a difference between a sensed position and an actual position of input with respect to the detection area at a point in time.

3. The system of claim 2, wherein the difference results from grid properties of sensors of the interaction device or a type of sensor of the interaction device.

4. The system of claim 1, wherein the input comprises contact between the one or more objects and the detection area of the interaction device.

5. The system one or more computer storage media of claim 1, wherein the one or more parameters are one or more encrypted parameters and the operations further comprise:
  receiving the one or more encrypted parameters in response to the interaction device being connected to a computing device; and
  decrypting the one or more encrypted parameters to provide the one or more parameters that are consumable by the computing device to correct the positional error associated with the input.

6. The system of claim 1, wherein the one or more parameters correct the positional error by providing an offset to the input from the one or more objects, the offset including at least one of an adjustment to an x-coordinate reported by the interaction device or an adjustment to a y-coordinate reported by the interaction device.

7. The system of claim 1, wherein the one or more parameters are based on at least one of:
  a velocity associated with movement of the input from the one or more objects;
  a region of the detection area of the interaction device that receives the input from the one or more objects; or
  an identification of the user interacting with the interaction device.

8. The system of claim 1, wherein the operations further comprise:
  learning the one or more parameters during a training phase; and
  storing the one or more parameters in the memory associated with the interaction device.

9. The system of claim 1, wherein the one or more parameters are unique to the interaction device.

10. The system of claim 1, wherein the determining the one or more parameters comprises learning the one or more parameters after the interaction device is connected to a computing device.

11. A method comprising:
receiving, at an operating system and from an interaction device, one or more encrypted parameters directed to correcting spatial error or jitter associated with the interaction device, the one or more encrypted parameters stored in a memory associated with the interaction device, the interaction device configured to sense a position of an object with respect to a detection area of the interaction device and provide the one or more encrypted parameters based at least in part on an interaction with the interaction device;
decrypting the one or more encrypted parameters to provide one or more parameters that are consumable by the operating system;
receiving, at the operating system and from the interaction device, interaction signals directed to moving one or more display screen elements; and
consuming the one or more parameters to correct the spatial error or the jitter associated with the interaction signals and the moving of the one or more display screen elements, wherein the one or more parameters provide an adjustment to one or more reported positions from the detection area of the interaction device.

12. The method of claim 11, wherein the adjustment comprises a coordinate adjustment directed to aligning the moving of the one or more display screen elements with one or more actual positions of input provided by the object with respect to the detection area of the interaction device.

13. The method of claim 11, wherein the one or more parameters are based on a velocity associated with movement between at least two of the one or more reported positions.

14. The method of claim 11, wherein the one or more parameters are based on a region of the detection area of the interaction device that receives input.

15. The method of claim 11, further comprising determining an identity of a user interacting with the interaction device, wherein the one or more parameters are based on the identity of the user.

16. The method of claim 11, wherein the one or more parameters are unique to the interaction device, the method further comprising:
 learning the one or more parameters during a training phase;
 encrypting the one or more parameters to provide the one or more encrypted parameters;
 storing the one or more encrypted parameters in the memory associated with the interaction device; and
 authorizing the operating system to consume the one or more parameters by providing the operating system with a decryption algorithm to decrypt the one or more encrypted parameters.

17. The method of claim 11, wherein the one or more encrypted parameters are received at the operating system from the interaction device as part of an encrypted data packet indicating that the interaction device is certified for use by the operating system.

18. The method of claim 11, wherein the spatial error or the jitter results from grid properties of sensors of the interaction device or a type of sensor of the interaction device.

19. A system comprising:
 one or more processors;
 one or more computer memories;
 an enumeration module, stored on the one or more memories and operable on the one or more processors, to determine that an interaction device is connected to the system and to receive one or more encrypted parameters directed to correcting positional error associated with input provided to the system from the interaction device;
 a decryption module, stored on the one or more memories and operable on the one or more processors, to decrypt the one or more encrypted parameters to provide one or more parameters consumable by the system; and
 a compensation module, stored on the one or more memories and operable on the one or more processors, to consume the one or more parameters to correct for the positional error associated with the input provided to the system from the interaction device.

20. The system of claim 19, wherein the one or more parameters are based on at least one of:
 a velocity associated with movement associated with the input provided to the system from the interaction device;
 a region of a detection area of the interaction device that receives the input provided to the system from the interaction device; or
 an identification of the user interacting with the system.

* * * * *